United States Patent Office 3,407,568
Patented Oct. 29, 1968

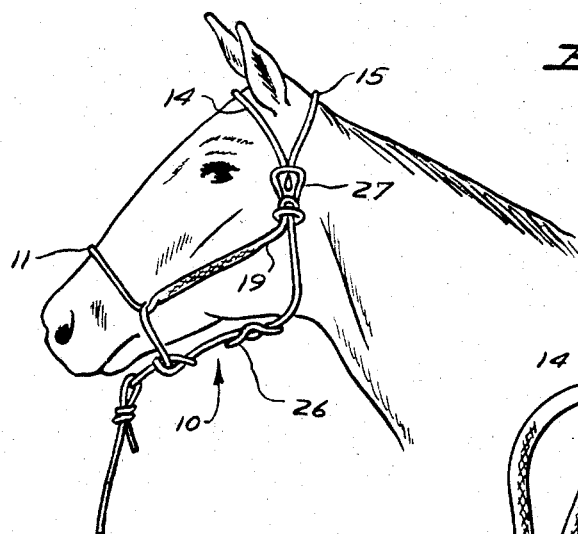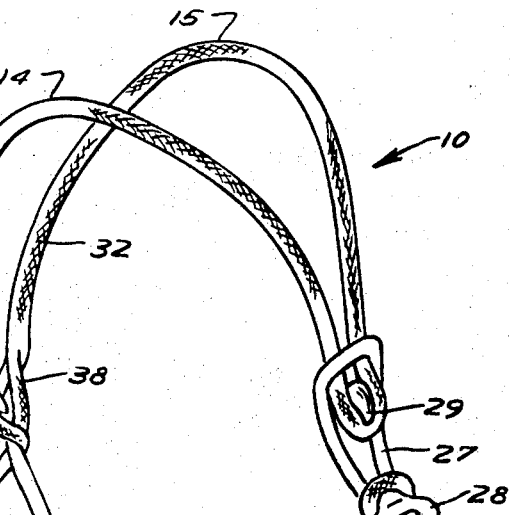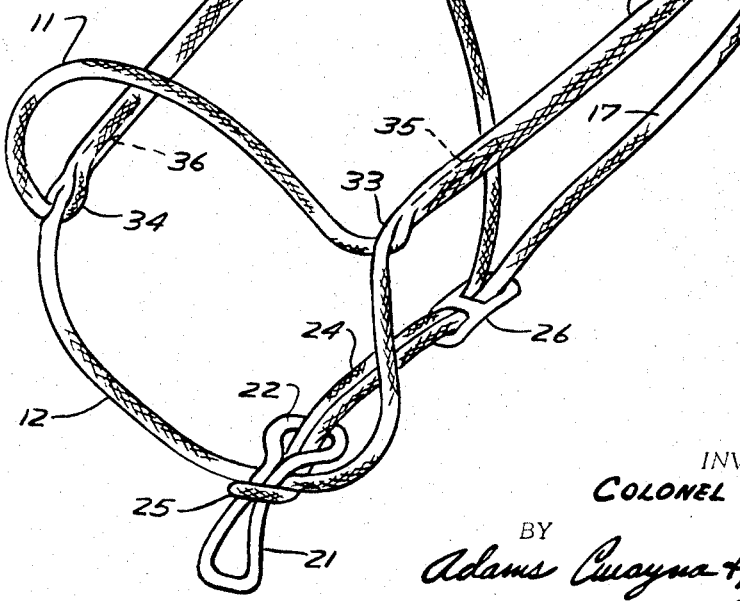

3,407,568
HOLLOW BRAIDED ANIMAL HALTER
Colonel Henry, Lawton, Iowa 51030
Filed Sept. 13, 1966, Ser. No. 579,112
4 Claims. (Cl. 54—24)

The present invention is concerned generally with an improved animal halter, and more specifically to an improved halter of this type which is fabricated from a pair of length of braided hollow-core line, each length being fabricated from a plurality of groups of filaments which form a strand, the strands being braided together in the hollow-core fashion. Braided hollow-core line of this type may be inter-woven with other lengths of braided hollow-core line in order to become lockingly engaged therewith. The arrangement of this line is such that dangling terminal end portions may be concealed by their being inserted within the confines of appropriately positioned segments of similar hollow-core line.

In the preparation and production of animal halters, it is normally necessary for the manufacturer to stock various sizes and weights of halters, this requirement making it necessary to stock various sizes and weights of fittings which are appropriately part of the halter device. In any animal halter, the greatest wear occurs in the areas of high stress, which frequently are along the juncture of the nose-piece and the interconnecting lines between the nose-piece and the head-piece. It is in this general area where the greatest amount of strain is present between the individual components of the halter and accordingly the greatest amount of wear and danger from breakage occurs here. When this juncture point employs hardware, such as for example, a metallic juncture element, this point normally will form one of the weakest areas in the halter assembly. In other words, since the hardware portion which is in contact with the line is normally metallic, these components are not of matching durability and hence the line normally fails due to the concentration of stresses in these junction areas. Since hollow-core braided synthetic line of high strength is now available, it is possible to fabricate an animal halter utilizing two individual lengths of line, inter-woven through to form juncture points with matching durability. In addition, these juncture points are fabricated in such a fashion that there are no dangling ends exposed.

Briefly, according to the present invention, the animal halter design comprises a pair of individual length of hollow-core line, preferably fabricated from synthetic material such as nylon, polyethylene, or the like, which hollow-braid line can be woven through itself so that the finished halter does not require hardware at the splice areas. The animal halter prepared in this fashion is exceptionally durable, and has strength built into the unit where required, and utilizes materials of matching strength and characteristics in order to equalize the effects of wear and stress.

The use of line prepared from synthetic fibers as indicated above is particularly adaptable to animal halters. In this connection, they are both rot resistant and generally water-proof. Furthermore, the material is dimensionally stable, has a minimum stretch characteristic, and is accordingly preferred over conventional manila line, rawhide elements or the like.

Therefore, it is an object of the present invention to provide an improved animal halter utilizing a pair of individual length of line together with a minimum of hardware, the halter being prepared from braided hollow-core line.

It is yet a further object of the present invention to provide an improved animal halter prepared from a pair of individual length of hollow-core braided synthetic fibers which halter utilizes a bare minimum of external hardware elements.

It is still a further object of the present invention to provide an improved animal halter which is fabricated from a pair of length of hollow-core braided line prepared from synthetic fibers, various portions of the line being enclosed with certain other portions of an adjoining line in order to provide a single unitary structure.

Other and further objects of the present invention will become apparent to those skilled in the art upon a study of the following specification, appended claims, and accompanying drawing wherein:

FIGURE 1 is a side view of the head and neck portion of a horse fitted with a halter prepared in accordance with the present invention; and FIGURE 2 is an enlarged prospective view of a halter prepared in accordance with the present invention, and illustrating the winding and coupling technique utilized to form the halter with a minimum requirement of external hardware for securing the various portions of the halter together.

In accordance with the preferred modification of the present invention, the animal halter generally designated 10 as shown in FIGURES 1 and 2 comprises a nose loop portion including an upper segment or sector 11 and a lower segment or sector 12, a head loop portion with a pair of upper segments 14 and 15 together with a pair of lower segments 16 and 17, the head-piece and the nose-piece being coupled together generally by the lateral pieces or segments 18 and 19. In order to conveniently apply a lead or tether line to the animal through the halter, a figure 8 link 21 is provided, this link having a conventional pair of openings or eyes at opposite ends thereof together with a central closed shank portion or area therebetween. The rear open portion as shown at 22 is adapted to receive two widths of line, such as is shown at 24, these line portions 24 being continuous through the loop as shown at 25.

Only a bare minimum of external hardware is required in the halter of the present design. In this connection, the assembly utilizes a slidable adjusting member as shown at 26, in order to control the size and disposition of the head loop portion. In addition, an anchor member is shown at 27, this member including an eyelet portion at 28 together with a lock, hook or claw as at 29. The eyelet portion 28 operates as an anchor for the juncture loop between the lateral side piece 19 and the lower head loop portion 17, while the upper portion including the core member 29 operates to provide an anchoring point for the upper head loop portions 14 and 15. The only other hardware required is shown in the adjusting buckle 30, this adjusting buckle operating as an anchor terminal point for the head loop portion 14.

In preparing the two-piece animal halter of the present invention, the operator initially cuts a pair of lengths of line from a supply roll, the length of each being adequate to prepare the size of halter desired. For a normal size horse, for example, a major portion of about 15 feet in length is required, and a minor portion of about 2 feet in length is also required. With particular attention directed to FIGURE 2 of the drawing, it will be seen that the initial operation is to couple the major loop portion to the minor loop portion, and this is done adjacent the nose-piece, particularly as illustrated by the upper nose-piece segment 11 which actually comprises most of the length of the minor loop arrangement. This minor loop is threaded into the major loop by means of passing the minor length portion through openings in the braid of the major loop portion at points spaced about 40 inches and 48 inches respectively from the free end as shown at 32. These two juncture points are illustrated at 33 and 34 respectively. In order to render the unit more complete, the nose-piece segment 12 is generally about 1 inch greater in length than the nose-piece segment 11. In order to lockingly engage the minor length portion with the major length portion of the line, the minor length portion is caused to be passed through the braids of the major length portion at points 33 and 34, and thereafter the locking engagement between these two segments is established by passing the free ends of the major length portion through the braid of the minor length portion adjacent the points 33 and 34. This can be seen from a study of the arrangement of the lines at 34. Thereafter, the openings in the braid of the major length are spread, and the free ends 35 and 36 of the minor length portion are received within the opening in the braid, this eliminating the presence of dangling free ends from the minor loop portion. The only remaining juncture point on the assembly is shown at 38 of the drawing, this being adjacent the free end 32 of the line. The arrangement at 38 is basically similar to that shown at 33 and 34, with the exception of the locking of the buckle 30 within the hollow braid line. After the free end 39 has been passed through the braid at a point about 6 inches from the free end 32, the buckle member 30 is received on the free end 39, and placed adjacent the juncture point at 38. After placing the buckle 30 thereon, the locking engagement between the ends 32 and 39 is achieved by initially passing the end 39 through the braid adjacent the end 32 as at the juncture 38, this being followed by inserting the free end 32 into the braid portion adjacent the juncture 38, particularly as shown in FIGURE 2. Thereafter, the hardware is attached to the assembly, where required, and the halter is then ready for use.

It will be appreciated, of course, that halters may be prepared for animals other than horses using similar techniques, and in addition halters may be prepared for horses of unusual or exception size using this technique.

For an ordinary mature horse, a braided polyethylene rope or cord having a total of about 12 inter-woven strands formed from a plurality of filaments, having an inner-core diameter of about 7/16 to about 3/8 inch has been found suitable. Such a line has a test strength of about 2,000 pounds or more and is available commercially.

It will be appreciated that the specific examples given herein are for purposes of illustration only, and that those skilled in the art may depart from the form, details, arrangements and proportions of the parts without necessarily departing from the scope of the invention as set forth in the appended claims. In addition, it will be appreciated that the individual segments of line, that is, the major length portion and the minor length portion are preferably fabricated from complimentary or mutually compatible size line. Generally, the lines comprising these individual segments are identical, however, it will be appreciated that for unusual design, it may be desirable to fabricate the minor loop portion forming the upper nose-piece segment 11 from somewhat different material such as, for example, a more decorative material than the remaining portions of the halter.

What is claimed is:

1. Halter means for livestock comprising a yoke, a nose loop portion, a head loop portion with upper and lower components and a pair of side pieces connecting said nose loop portion to said head loop portion, said halter means being formed from a pair of complementary lengths of hollow braided line including major and minor length segments, each segment having opposite respective terminal ends and each being adapted to receive and enclose another section of said line within itself, said nose loop portion being formed from a pair of sectors including an upper sector and a lower sector, one of said sectors being formed from said major segment, the other from said minor segment and with said minor segment being lockingly engaged with said major segment at points spaced apart substantially one-half of the composite peripheral length of said nose loop portion and having the free ends threreof inserted within the braid of said major segment and extending in oppositely disposed directions therein to form a pair of coaxial side pieces extending from said nose loop and terminating at first and second points along and within said major segment, said first point being spaced from a first terminal end of said major segment by a line length substantially equal to twice the length of the upper component of said head loop portion, said second point being spaced from the other terminal end of said major segment by a line length substantially equal to the composite length of the lower component of said head loop portion and twice the length of the yoke, one terminal end of said major segment extending freely from said head loop portion with the other terminal end area being lockingly engaged with said major segment at said first point and having its free end inserted within said major length segment line adjacent said first point, said yoke comprising an integral loop formed as extensions of the lower component of said head loop portion.

2. The halter means as defined in claim 1 being particularly characterized in that said braided line is woven together, and contracts the diameter thereof upon application of tension thereto.

3. The halter means as defined in claim 1 being particularly characterized in that the upper sector of said nose loop is formed from said minor segment.

4. The halter means as defined in claim 3 being particularly characterized in that the upper sector of said nose loop is slightly smaller than the lower sector.

References Cited

UNITED STATES PATENTS

| 643,123 | 2/1900 | Green et al. | 54—24 |
|---|---|---|---|
| 1,138,115 | 5/1915 | Johnson | 54—24 |
| 1,172,328 | 2/1916 | Wardwell | 87—9 |
| 1,747,071 | 2/1930 | Green | 54—85 |
| 2,614,451 | 10/1952 | Lippey | 87—9 |
| 2,961,816 | 11/1960 | Reed | 54—24 |
| 3,102,715 | 9/1963 | Weitzel et al. | 87—9 X |
| 3,130,630 | 4/1964 | Dawes | 87—2 |
| 3,273,311 | 9/1966 | Henry | 54—24 |

ALDRICH F. MEDBERY, *Primary Examiner.*